(12) United States Patent
Cheng et al.

(10) Patent No.: US 7,479,605 B2
(45) Date of Patent: Jan. 20, 2009

(54) GLASS SUBSTRATE CARRIER ASSEMBLY

(75) Inventors: Jui-Chung Cheng, Hsinchu (TW); Tung-Yin Shiue, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 355 days.

(21) Appl. No.: 11/499,570

(22) Filed: Aug. 4, 2006

(65) Prior Publication Data

US 2008/0042019 A1 Feb. 21, 2008

(51) Int. Cl.
*H05K 7/14* (2006.01)
(52) U.S. Cl. .................. 174/542; 174/51; 206/708; 206/709; 361/799
(58) Field of Classification Search .......... 174/51, 174/542; 206/708, 709; 361/799, 800
See application file for complete search history.

(56) References Cited

U.S. PATENT DOCUMENTS 4,563,722 A * 1/1986 Maroney et al. ............ 361/212
5,201,415 A * 4/1993 Metz ......................... 206/707
6,452,805 B1 * 9/2002 Franz et al. ................. 361/724
6,683,792 B2 * 1/2004 Shirakami et al. .......... 361/796
6,707,686 B2 * 3/2004 Fritz et al. .................. 361/796
6,728,115 B1 * 4/2004 Le et al. ..................... 361/816
6,781,205 B1 * 8/2004 Levit et al. .................. 257/355

* cited by examiner

*Primary Examiner*—Hung V Ngo
(74) *Attorney, Agent, or Firm*—Alan Kamrath; Kamrath & Associates PA

(57) ABSTRACT

A glass substrate carrier assembly has a shelf and multiple pickup caps. The shelf is connected electrically to ground and has a bar, two stands and two brackets. The bar has two ends. The stands are mounted respectively on and extend down from the ends of the bar, are connected electrically to ground and are electrically conductive. The brackets are electrically conductive, are mounted respectively on and extend perpendicularly inward from the stands below the bar and face each other, and each bracket is T-shaped and has a distal edge and multiple tabs. The tabs are electrically conductive and are mounted on and extend perpendicularly from the distal edge of the bracket. The pickup caps are electrically conductive and are mounted on the tabs. Static electricity will pass through the pickup cap, the tab, the bracket and the stands to ground so static electricity will be removed from the shelf.

6 Claims, 3 Drawing Sheets

GLASS SUBSTRATE CARRIER ASSEMBLY

BACKGROUND OF THE INVENTION

1. Field of Invention

The present invention relates to a glass substrate carrier assembly, and more particularly to the glass substrate carrier assembly that removes static electricity.

2. Description of the Related Art

Liquid crystal displays (LCDs) have gradually come to dominate the display market because the LCD is thin and light and has a glass substrate. A process for producing the LCD comprises forming thin-film transistors and circuits on the glass substrate by using a photolithography process. The photolithography process coats a layer of a photoresist homogeneously on the glass substrate and then transfers a pattern from a mask to the photoresist layer before conducting a development process.

A current method to coat the glass substrate with photoresist mounts the glass substrate on a photoresist spin coater and dispense a specific amount of photoresist on the center of the upper surface of the glass substrate. Finally, the photoresist spin coater is operated at a high speed to generate a centrifugal force and rotate the glass substrate. The centrifugal force causes the photoresist to diffuse radially from the center to the edge of the glass substrate, so the photoresist covers the whole upper surface and solidifies.

After the coating procedure, the edge of the glass substrate often has burrs generated by solidifying photoresist being slung out from the edge of the glass substrate. Consequently, the glass substrate must be transferred from the photoresist spin coater to de-burring device by a carrier assembly to remove the burrs. The carrier assembly comprises a shelf and two brackets. The shelf can move horizontally. The brackets protrude from the shelf longitudinally, face each other and has multiple pickup caps mounted on the brackets. Each bracket connects to a vacuum pump by a tube, and the vacuum pump generates a suction in the pickup caps to hold the glass substrate against the pickup caps. The suction applied to the pickup caps causes static electricity to build up in the pickup caps.

After the glass arrives at the de-burring device, the glass substrate detaches from the pickup cap. However, the static electricity produced by the pickup cap is 15-16 kilovolt (KV) that easily damages semiconductor elements and circuits on the glass substrate and may even damage the glass substrate.

To overcome the shortcomings, the present invention provides a glass substrate carrier assembly to mitigate or obviate the aforementioned problems.

SUMMARY OF THE INVENTION

The primary objective of the present invention is to provide a glass substrate carrier assembly to remove static electricity.

To achieve the objective, the glass substrate carrier assembly comprises a shelf and multiple pickup caps. The shelf is connected electrically to ground and comprises a bar, two stands and two brackets. The bar has two ends. The stands are mounted respectively on and extend down from the ends of the bar, are connected electrically to ground and are electrically conductive, and each stand has an inner surface. The brackets are electrically conductive, are mounted respectively on and extend perpendicularly inward from the inner surfaces of the stands below the bar and face each other, and each bracket is T-shaped and has a distal edge and multiple tabs. The tabs are mounted on and extend perpendicularly from the distal edge of the bracket and are conductive. The pickup caps are electrically conductive and are mounted respectively on the tabs over the suction holes. Static electricity will pass through the pickup cap, the tab, the bracket and the stands to ground, so static electricity will be removed from the shelf as it is generated.

Other objectives, advantages and novel features of the invention will become more apparent from the following detailed description when taken in conjunction with the accompanying drawings.

DETAILED DESCRIPTION OF THE INVENTION

Figure 1:
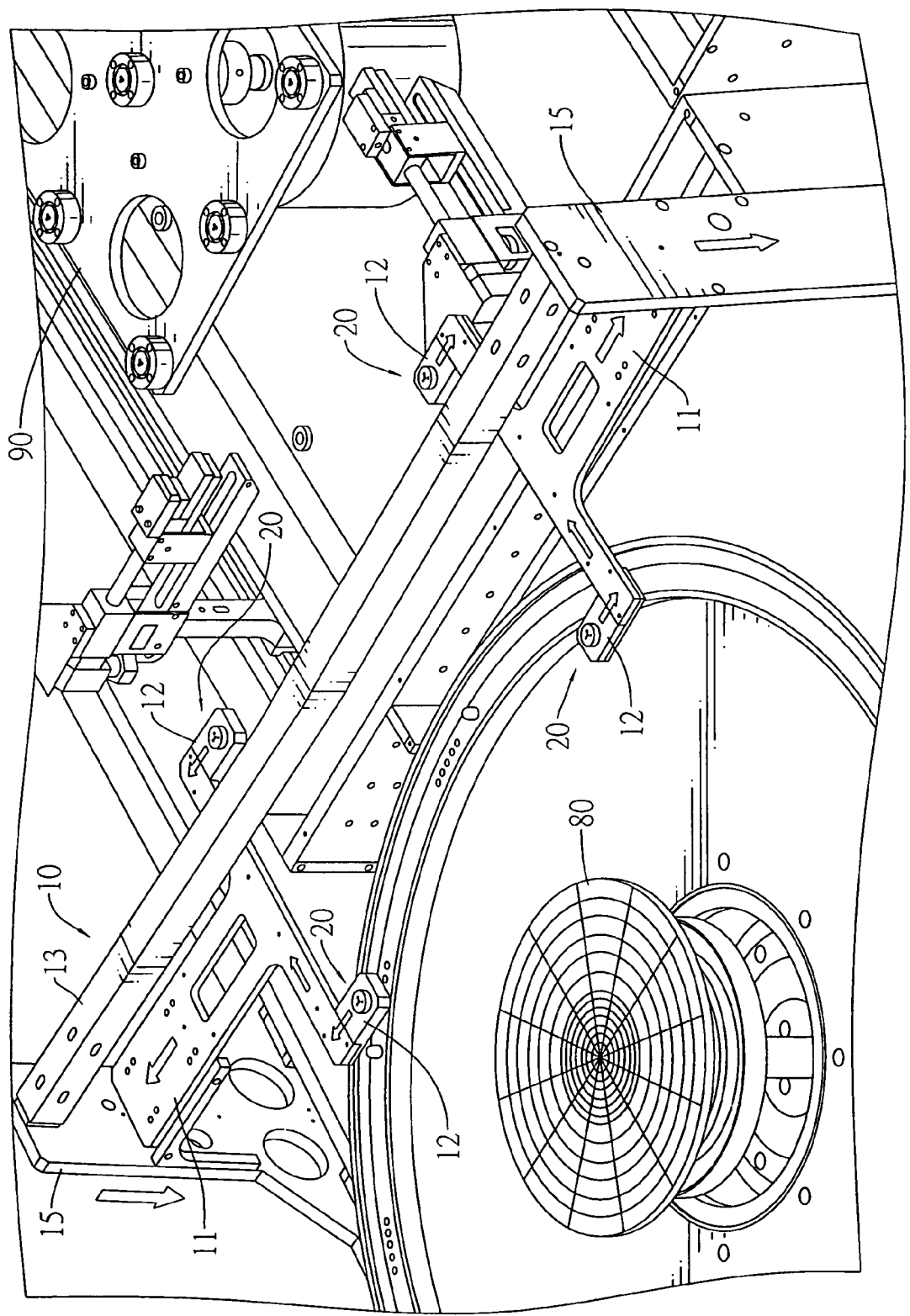
FIG. 1 is a perspective view of a glass substrate carrier assembly in accordance with the present invention with a photoresist coater device and a de-burring device.
Figure 2:
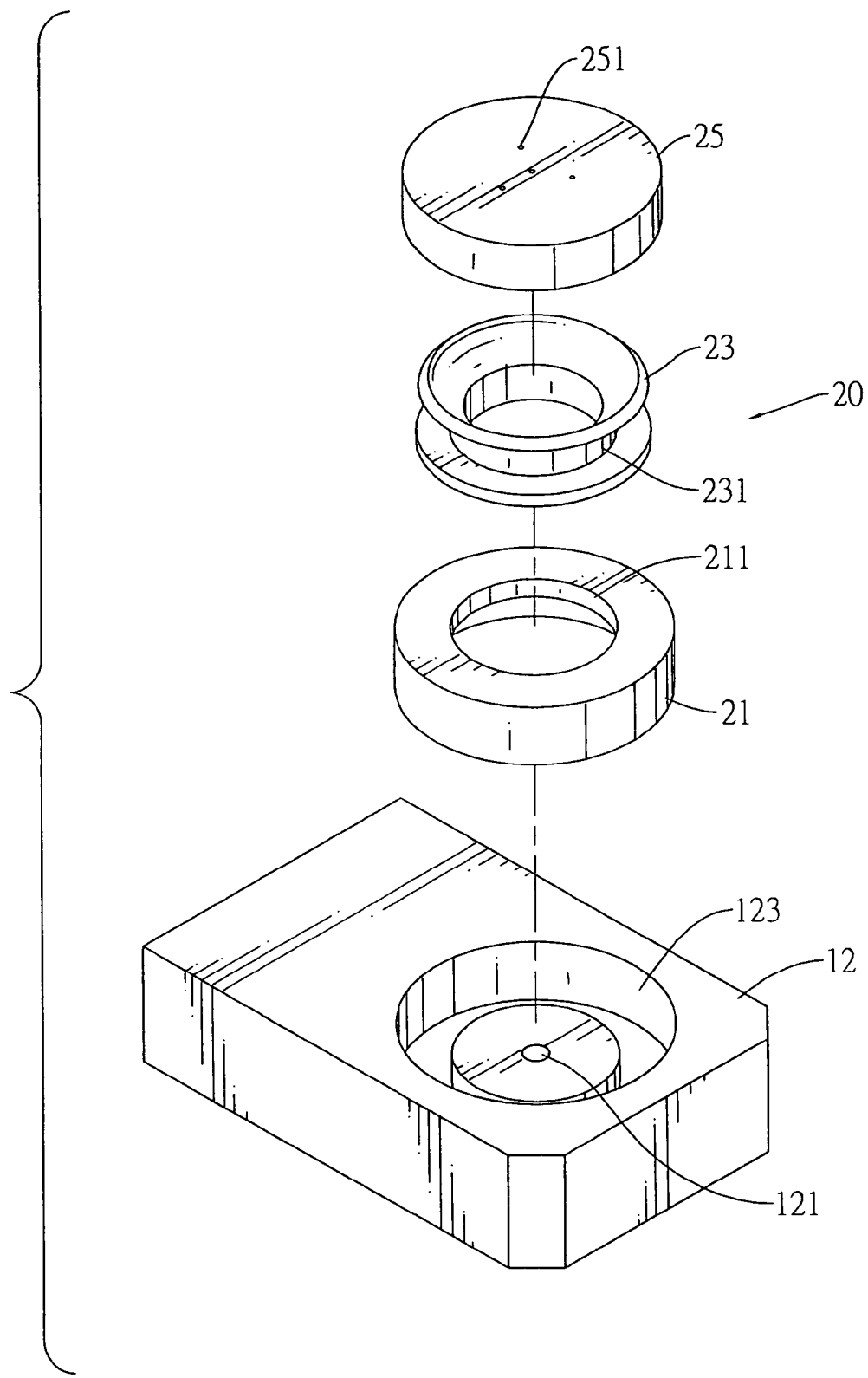
FIG. 2 is an exploded perspective view of a pickup cap of the glass substrate carrier assembly in FIG. 1.
Figure 3:
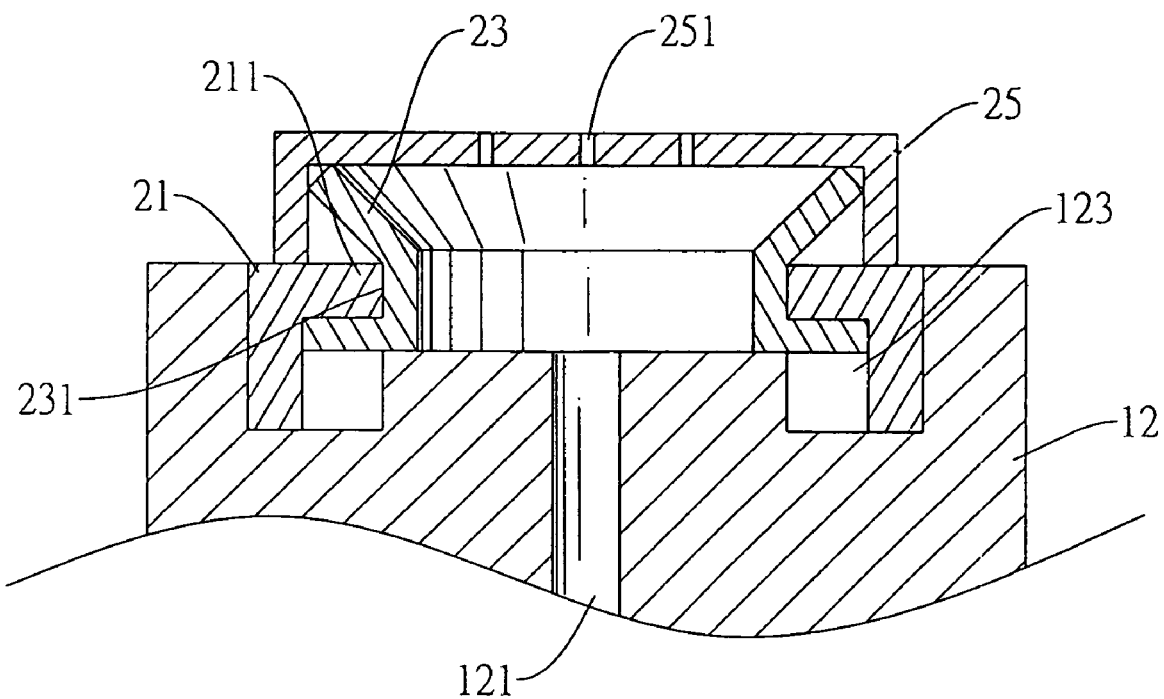
FIG. 3 is a cross sectional view of a pickup cap of the glass substrate carrier assembly in FIG. 1.

With reference to FIGS. 1 to 3, a carrier assembly in accordance with the present invention is mounted between a photoresist coater (80) and a de-burring device (90), moves back and forth between the photoresist coater (80) and the de-burring device (90) and comprises a shelf (10) and multiple pickup caps (20).

The shelf (10) moves horizontally, is connected electrically to a ground and comprises a bar (13), two stands (15) and two brackets (11).

The bar (13) has two ends.

The stands (15) are mounted respectively on and extend down from the ends of the bar (13), are electrically conductive and are connected electrically to ground, and each stand (15) has an inner surface.

The brackets (11) are electrically conductive, are mounted respectively on and extend perpendicularly inward from the inner surfaces of the stands (15) below the bar (13) and face each other, Each bracket (11) is T-shaped and has a distal edge and multiple tabs (12). The tabs (12) are electrically conductive and are mounted on and extend perpendicularly from the distal edge of the bracket (11). Each tab (12) has an upper surface, a recess (123) and a suction hole (121). The recess (123) is formed in the upper surface of the tab (12). The suction hole (121) is formed through the tab (12), communicates with the recess (123) and connects to a vacuum pump through a tube so a suction force is generated in the suction hole (121).

The pickup caps (20) are resilient and electrically conductive, are mounted respectively on the upper surfaces of the tabs (12) over the suction hole (121) and are mounted respectively in the recesses (123) of the tabs (12). Each pickup cap (20) may be made of a mixture of a resilient material and a conductive material to be resilient and conductive, has at least one through hole and may be implemented with a mounting collar (21), a seal (23) and a cap (25). The resilient material may be a rubber. The conductive material may be a carbonaceous material, graphite, metal or the like. The pickup cap (20) may have a resistivity from $10^3$-$10^5$ ohms/sq. The through holes correspond respectively to the suction holes (121) in the tabs (12). Static electricity generated by air passing through the suction hole (121) and the pickup cap (20) will pass through the pickup cap (20), the tab (12), the bracket (11) and the stands (15) that are electrically connected to ground so the static electricity will be removed from the shelf (10) as it is generated.

The mounting collar (21) is a sleeve, is mounted in the recess (123) in the tab (12) and has an upper end and a lip (211). The lip (211) extends radially inward from the upper end.

The seal (23) has a central hole, an outer wall and an annular recess (231). The annular recess (231) is formed in the outer wall and engages the lip (211) on the mounting collar (21) to hold the seal (23) in the mounting collar (21).

The cap (25) is mounted on the mounting collar (21) securely against the seal (23) and has at least one hole (251). The at least one through hole (251) corresponds to and communicates with the suction hole (121) in the tab (12) through the central hole in the seal (23) and the mounting collar (21).

When the carrier assembly carries the glass substrate from the photoresist coater (80) to the de-burring device (90), a glass substrate is securely mounted on the pickup caps (20) by an attraction from the vacuum pump. After the glass substrate arrived the de-burring device (90), the vacuum pump is stopped to detach the glass substrate from the carrier assembly. Because static electricity will pass through the pickup cap (20), the tab (12), the bracket (11) and the stands (15) connected electrically to ground, static electricity will be removed from the shelf (10) as it is generated. Thus, static electricity will not build up to damage semiconductor elements and circuits on the glass substrate or the glass substrate, which will result in improved quality and reduced cost of the glass substrate.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A glass substrate carrier assembly comprising:
    a movable shelf adapted for being connected electrically to ground and comprising
        a bar having two ends;
        two stands mounted respectively on and extending down from the ends of the bar, being electrically conductive and adapted for being connected electrically to ground, and each stand having an inner surface;
        two brackets being electrically conductive, being mounted respectively on and extending perpendicularly inward from the inner surfaces of the stands below the bar and facing each other, and each bracket having
            a distal edge; and
            multiple tabs being electrically conductive and mounted on and extending perpendicularly from the distal edge of the bracket, and each tab having an upper surface; and
            a suction hole being formed through the tab; and
    multiple pickup caps being resilient and electrically conductive and mounted respectively on the upper surfaces of the tabs, and each pickup cap having at least one through hole.

2. The carrier assembly as claimed in claim 1, wherein each pickup cap comprises a carbonaceous material.

3. The carrier assembly as claimed in claim 1, wherein each pickup cap comprises graphite.

4. The carrier assembly as claimed in claim 1, wherein each pickup cap comprises metal.

5. The carrier assembly as claimed in claim 1, wherein
    each tab further has a recess formed in the upper surface of the tab;
    the suction hole of each tab communicates with the recess in the tab; and
    the pickup caps are mounted respectively in the recesses in the tabs.

6. The carrier assembly as claimed in claim 5, wherein each pickup cap further has
    a mounting collar being a ring and mounted in the recess in a corresponding tab and having
        an upper end; and
        a lip extending inward from the upper end;
    a seal having
        a central hole;
        an outer wall; and
        an annular recess formed in the outer wall and engaging the lip on the mount collar to hold the seal in the mounting collar; and
    a cap mounted on the mounting collar securely against the seal and having at least one hole corresponding to and communicating with the suction hole in the corresponding tab.

* * * * *